US012389975B2

(12) United States Patent
Ventenat (10) Patent No.: US 12,389,975 B2
(45) Date of Patent: Aug. 19, 2025

(54) METHOD FOR MANUFACTURING A SOLE STRUCTURE COMPRISING A FULLY OR PARTIALLY HOT-FORMED TEXTILE SOLE ELEMENT, AND FOOTWEAR ITEM COMPRISING SUCH A SOLE STRUCTURE

(71) Applicant: DECATHLON, Villeneuve d'Ascq (FR)

(72) Inventor: Vincent Ventenat, Villeneuve d'Ascq (FR)

( * ) Notice: Subject to any disclaimer, the term of this patent is extended or adjusted under 35 U.S.C. 154(b) by 112 days.

(21) Appl. No.: 17/802,152

(22) PCT Filed: Feb. 24, 2021

(86) PCT No.: PCT/EP2021/054612
§ 371 (c)(1),
(2) Date: Aug. 25, 2022

(87) PCT Pub. No.: WO2021/170682
PCT Pub. Date: Sep. 2, 2021

(65) Prior Publication Data
US 2023/0346067 A1  Nov. 2, 2023

(30) Foreign Application Priority Data
Feb. 25, 2020 (FR) ...................... 2001850

(51) Int. Cl.
B29D 35/04 (2010.01)
A43B 1/028 (2022.01)
A43B 1/04 (2022.01)
A43B 13/04 (2006.01)
A43B 13/22 (2006.01)
A43B 23/04 (2006.01)
A43C 15/16 (2006.01)
B29D 35/00 (2010.01)
B29D 35/12 (2010.01)

(52) U.S. Cl.
CPC .............. *A43B 1/04* (2013.01); *A43B 1/028* (2022.01); *A43B 13/04* (2013.01); *A43B 13/223* (2013.01); *A43B 23/04* (2013.01); *A43C 15/167* (2013.01); *B29D 35/0063* (2013.01); *B29D 35/04* (2013.01); *B29D 35/122* (2013.01); *B29D 35/126* (2013.01); *B29D 35/128* (2013.01)

(58) Field of Classification Search
CPC .. B29D 35/0063; B29D 35/04; B29D 35/122; B29D 35/126; B29D 35/128; B29D 35/0054; B29D 35/02; A43B 1/04; A43B 1/028; A43B 13/04; A43B 13/223; A43B 23/04; A43B 23/02; A43B 23/0205; A43C 15/167
USPC .......................................................... 264/239
See application file for complete search history.

(56) References Cited

U.S. PATENT DOCUMENTS

| 9,775,401 | B2 | 10/2017 | Cross et al. | |
|---|---|---|---|---|
| 9,848,673 | B2 | 12/2017 | Cross | |
| 10,112,357 | B2 | 10/2018 | Boucher et al. | |
| 10,568,383 | B2 | 2/2020 | Cross et al. | |
| 2006/0021257 | A1* | 2/2006 | Hung | A43B 13/026 36/73 |
| 2014/0310986 | A1 | 10/2014 | Tamm et al. | |
| 2016/0206039 | A1 | 7/2016 | Cross et al. | |
| 2016/0206040 | A1* | 7/2016 | Cross | D04B 1/24 |
| 2016/0295971 | A1 | 10/2016 | Arnese et al. | |
| 2017/0006962 | A1 | 1/2017 | Tanabe et al. | |
| 2017/0129200 | A1 | 5/2017 | Adami et al. | |
| 2017/0181501 | A1 | 6/2017 | Gautier et al. | |
| 2018/0317606 | A1 | 11/2018 | Schneider et al. | |
| 2021/0219659 | A1 | 7/2021 | Decathlon | |
| 2024/0341403 | A1* | 10/2024 | Ventenat | A43B 17/12 |

FOREIGN PATENT DOCUMENTS

| FR | 3007317 B1 | 12/2014 |
|---|---|---|
| WO | 2016115156 A1 | 7/2016 |
| WO | 2016115157 A1 | 7/2016 |
| WO | 2019234374 A1 | 12/2019 |

* cited by examiner

*Primary Examiner* — Hannah J Pak (57) ABSTRACT

A method for manufacturing a sole structure involving supplying at least one textile sole element having an outer face, including one or more at least partially hot-meltable filament(s); placing the at least one textile sole element in a mould structure including a sole cavity intended to come into contact with the outer face of the textile sole element; placing an inflatable bladder in the mould structure and inflating the inflatable bladder to press the outer face of the textile sole element either directly or indirectly firmly against the sole cavity and heating the textile sole element to melt the at least partially hot-meltable filament(s) and mould the sole cavity onto the outer face of the sole element; obtaining a sole structure including a thermally compressed textile sole element.

20 Claims, 7 Drawing Sheets

METHOD FOR MANUFACTURING A SOLE STRUCTURE COMPRISING A FULLY OR PARTIALLY HOT-FORMED TEXTILE SOLE ELEMENT, AND FOOTWEAR ITEM COMPRISING SUCH A SOLE STRUCTURE

TECHNICAL FIELD

The present disclosure relates to sole structures including fully or at least partly hot melted textile sole elements, as well as footwear including such structures, and the methods for manufacturing such sole structures, and footwear including them.

Conventional footwear generally include an upper and a sole structure. The upper is secured to the sole structure and forms an empty space inside the footwear to comfortably receive and secure a foot. The sole structure is secured to a lower area of the upper, and operatively disposed between the ground, and the upper. In sports footwear, the sole structure may include an outsole and a midsole. The midsole often includes a polymer foam material which absorbs shocks with the ground upon impact in order to mitigate the effects on the foot and the leg during walking, running or other ambulatory activities. The sole structure may also include a lining positioned in the vicinity of the lower surface of the foot to improve the comfort of the footwear. The soles are traditionally attached to the uppers by means of a Strobel lasting during which the different sole elements (insole, midsole and outsole in particular) are assembled. The methods for manufacturing a traditional shoe require dozens of steps, and produce many scraps resulting from the cuttings of materials.

It is sought to simplify the methods for manufacturing footwear, in particular by reducing the number of steps and/or the consumption of energy and materials. This problem is also part of the search for a manufacturing method that may be implemented as close as possible to the place of use of the footwear in order to reduce its carbon impact, facilitate stock management and allow customization of the footwear.

A solution includes eliminating the sewing steps necessary to shape the initially planar upper in three dimensions. The upper is obtained from the assembly of one or a few pieces, and no longer from multiple pieces added together by sewing.

WO 2019/234374 A1 thus proposes a first textile bootie formed in three dimensions directly at the outlet of a textile loom (for example a knitting loom), partially hot-meltable, acting as an upper, then to attach this upper to an outsole. This upper is reinforced by disposing a second partially hot-meltable textile bootie, in three-dimensions, around the first bootie by wrapping the junction between the first bootie and the outsole in order to improve resistance to delamination. The assembly including the first and second textile booties and the outsole undergoes a heat treatment to melt the hot-meltable yarns and set the shape of the upper. The manufacturing method is simplified by significantly reducing the number of manufacturing steps. However, this footwear, including an upper resulting from the superposition of two, three or four textile booties, may be too heavy for the practice of some activities, in particular sports activities, requiring compliance with a specific weight for a determined footwear. For example, the standard weight of footwear for the practice of football is on the order of 165 g to 250 g.

In addition, the thermoforming of a rigid element, in this specific case, an outsole, between two flexible elements, namely two textile booties, causes difficulties in the reproducibility of the positioning of the elements together, increasing the scrap rate.

Furthermore, the outsole and/or a midsole is/are obtained by an injection method in which the number of polymer material(s) and the number of different colors are in practice limited to two for cost reasons. The possibilities of varying the materials and the aesthetics, particularly the colors, according to specific regions of the sole, are limited by the costs involved in adapting the method for injecting a sole. In order to facilitate demolding, it is necessary for the sole to have substantially the same overall thickness. Material recesses in the internal face of a sole are thus molded so that the amount of material injected is homogeneous over the entire surface of the sole and that the sole has a substantially constant thickness.

US 2016/0206046 A1 relates to a method for manufacturing a sole structure including the embossing of a planar textile sheet so as to locally deform the textile sheet to form studs. The embossed textile sheet has a constant thickness, equivalent to its initial thickness before embossing. The region of the internal face of the embossed textile sheet facing a stud is not planar but hollow. The studs formed being hollow, they are filled with a foam insert to consolidate them. This sole structure is fragile since it is necessary to fill the studs to reinforce them. In addition, the manufacturing technique is complex because the tool for embossing the textile sheet is the foam insert so that the embossed sheet perfectly matches the studs of the foam insert.

There is therefore a need for a sole structure that is simple to manufacture, that has good mechanical performances, that may be functionalized at will in the choice of the materials, colors, or locations of the latter, and that offers a wide choice in its shape, in particular in the possible sole cavities.

There is therefore also a need to lighten the footwear, while improving their comfort, by allowing a wide range of possible functions (reinforcement, cushioning, hard toe-puff, etc.), and this in a localized manner on the volume of the footwear, while preserving the properties of resistance to abrasion, to delamination, of flexibility, etc. usually desired.

SUMMARY

The present disclosure has for object, according to a first aspect, a method for manufacturing a sole structure, including:
 (i) providing at least one textile sole element having an external face, including one or several at least partly hot-meltable yarn(s);
 (ii) disposing the textile sole element in a mold structure including a sole cavity;
 (iii) disposing an inflatable bladder in the mold structure, and inflating the inflatable bladder to press, directly or indirectly, the external face of the textile sole element against the sole cavity, and heating the textile sole element in order to melt the at least partly hot-meltable yarn(s) and substantially mold the sole cavity on the external face of the textile sole element;
 (iv) obtaining a sole structure including at least one thermo-compressed textile sole element.

The inventors surprisingly discovered that it is possible to form a sole structure from at least one fully or partly hot-meltable textile sole element by using a thermo-compression method implementing an inflatable bladder.

The inventors have observed that the at least one textile sole element includes air disposed between the yarns forming its structure, which during the thermo-compression step allows this air to be expelled and thus facilitates its hot-forming. The flow of air through the textile sole element during its thermo-compression allows balancing the distribution of the hot melted material(s) in the sole cavity of the mold. Advantageously, the at least one thermo-compressed textile sole element is molded in a regular manner and does not include any air bubbles or hollow areas.

Advantageously, it is possible to form a sole structure with a sole cavity including one or several negative and/or positive cavity/cavities. Particularly, a positive or negative cavity is formed on the sole structure, in particular its external face, by filling the corresponding sole cavity of the mold structure with the hot melted material(s) derived from at least partly hot-meltable yarn(s).

The positive or negative cavities are therefore not formed by embossing the textile sole element. The sole structure according to the present disclosure therefore has a mechanical strength (flexural, puncture strength), and properties of foot support, hardness and resistance to abrasion, improved compared to an embossed textile sole structure, and therefore does not require a complementary reinforcing element filling the recesses formed to reinforce it.

The sole structure according to the disclosure preferably has a substantially full molded volume. Particularly, the sole cavity of the mold structure is intended to come into contact, directly or indirectly, with the external face of the textile sole element.

Advantageously, it is possible to functionalize the sole structure with materials having different mechanical (elasticity, hardness, etc.) and aesthetic (colors, yarn counts, . . . ) properties, and this in a differentiated and localized manner throughout the volume of the sole structure, which is not possible with a sole obtained by a conventional injection method if the imposed profitability related to the cost of manufacturing the molds is met.

Preferably, an inflatable bladder is disposed between the mold structure and the internal face of the textile sole element so that the inflated bladder comes into contact directly or indirectly with the internal face of the textile sole element.

The mold structure is preferably in several parts, for example right and left upper mold parts receive the inflatable bladder, and possibly the upper, and a lower mold part including the sole cavity receives the at least one textile sole element. Preferably, the mold structure may also be in two parts, an upper part receiving the inflatable bladder, and optionally the upper, and a lower part including the sole cavity and receiving the at least one textile sole element. This last disposition allows optimizing the joint planes and the quality of the finishes.

In one embodiment, a mother mold, particularly in the form of a core (in one or several parts), including one or several positive cavity/cavities and optionally one or several negative cavity/cavities, is machined or 3D printed in order to refine the drawing(s) of the positive cavity/cavities. The mother mold is preferably a mold in at least one metal or in an alloy of the metal.

A daughter mold, corresponding to the mold structure according to the present text, is obtained by overmolding of the mother mold, and thus includes one or several negative cavity/cavities, and possibly one or several positive cavity/cavities. The daughter mold is preferably a metal mold (for example a casting mold). The daughter mold could also be made of possibly reinforced polymeric material. In the latter case, it may be a composite material.

This disposition allows providing more precision and finesse to the cavities formed on the sole structure, and possibly to the cavities formed on the main textile bootie and/or the auxiliary textile bootie. It is indeed easier to bring complexity to the drawings and/or to the shape of the positive cavities of the mother mold, than to the negative recessed, therefore not easily accessible, cavities.

The mother mold and/or the daughter mold may be (each) in two or three parts or in as many parts as necessary to obtain satisfactory fineness of the designs and/or shapes of the cavities.

In another embodiment, the mold structure is directly machined or 3D printed. The mold structure in the present text may be configured to manufacture only the sole structure or to manufacture the sole structure and the upper of a footwear, particularly as described below. The mold structure may thus comprise, in addition to the sole cavity, an upper cavity including one or several negative and/or positive cavity/cavities.

The mold structure, particularly for the manufacture of a footwear, may be in two or in three parts, for example include an upper part receiving at least partly the upper and a lower part receiving at least partly the upper and the sole structure, the bottom part including lateral and medial lower parts.

Preferably, the sole structure includes substantially opposite internal and external faces.

Preferably, the textile sole element includes substantially opposite internal and external faces.

The external face of the at least one textile sole element and/or of the sole structure is/are preferably oriented towards the ground, and may come into contact directly with the ground when the thermo-compressed textile sole element and/or the sole structure is/are part of an outsole or is/are an outsole. The internal face of the at least one textile sole element and/or of the sole structure is/are preferably oriented facing the underside of the user's foot.

The sole structure and/or the textile sole element may include (each) a heel portion and/or a forefoot portion and/or a midfoot portion, particularly extending between a medial edge and a lateral edge of the footwear including the sole structure or the textile sole element.

The sole structure and/or the textile sole element may extend between a rear edge and a front edge on the one hand, and/or between a lateral edge and a medial edge on the other hand, of a footwear including the sole structure or the textile sole element.

Preferably, the inflated bladder exerts a pressure, directly or indirectly, on the internal face of the textile sole element, and pushes the textile sole element so that its external face comes into contact, directly or indirectly, against the sole cavity of the mold structure. Preferably, the textile sole element is thermo-compressed between the sole cavity of the mold structure and the bladder in the inflated state.

Preferably, the internal face of the thermo-compressed textile sole element is substantially planar. Indeed, the inflatable bladder preferably has a substantially smooth surface so that this surface coming into contact directly or indirectly with the internal face of the textile sole element flattens it. The pressure imposed by the push of the inflatable bladder contributes to this flattening.

Preferably, after the thermo-compression step iii), the method includes a step of cooling the mold structure including the at least one thermo-compressed textile sole element. This step allows setting the textile sole element in its thermo-compressed state.

The sole structure may include of one or several textile, in particular thermo-compressed, sole element(s), particularly one or several textile sole element(s) form(s) one or several outsole and/or midsole and/or insole element(s).

Preferably, the sole structure is an outsole structure or a midsole structure or a combination thereof.

The textile sole element may be one or several knit(s), one or several fabric(s), one or several non-woven fabric(s), one or several braid(s), one or several array(s) of yarn(s)/fiber(s), or a combination thereof.

The array of yarn(s)/fiber(s) may be obtained by additive manufacturing for example.

Preferably, the sole structure includes at least one knitted textile sole element.

Preferably, the sole structure includes at least one or several textile sole element(s), in particular thermo-compressed in step iii), associated with one or several auxiliary sole element(s), optionally thermo-compressed during step iii). The auxiliary sole element(s) may be configured so as to provide one or several particular cushioning, rebound, or stiffening function(s). The auxiliary sole element(s) may be a textile (knit(s), and/or fabric(s), and/or non-woven fabric(s), and/or one or several braid(s), and/or array(s) of yarn(s)/fiber(s)) or a foam element or a polymeric film or a cushioning element, for example in the form of a donut. The auxiliary sole element(s) may be thermo-compressed with the textile sole element(s) in step iii) or be added onto the at least one thermo-compressed textile sole element after step iii), for example by bonding.

Preferably, the textile sole element is one or several, particularly at least partly or totally, superimposed knit(s). The knit(s) may be weft knitted or warp knitted. The knit(s) may be three-dimensional, that is to say include upper and lower layers knitted and connected together by at least one knitted yarn.

The textile sole element may be knitted on a flat knitting loom or a circular knitting loom, in particular on a warp knitting loom or a rachel knitting loom. The textile sole element, optionally and/or the auxiliary sole element, comprise(s) one or several at least partly hot-meltable yarn(s), optionally with at least one or several, at least partly non-hot-meltable or non-hot-meltable, yarn(s).

Preferably, the textile sole element, particularly one or several knit(s), is of unitary textile construction.

Yarn(s) According to the Disclosure

The at least partly hot-meltable, or at least partly non-hot-meltable yarn(s) is/are one or several monofilament yarn(s), and/or multifilament yarn(s) and/or fiber spun yarn(s), and/or elongated element(s) (e.g. a tape or a braid), or a combination thereof.

The yarn(s) may or may not be of different colors, transparent or opaque.

The monofilament yarn(s) preferably has/have a diameter greater than or equal to 0.01 mm and less than or equal to 5 mm, more preferably a diameter greater than or equal to 0.1 mm and less than or equal to 2 mm.

The multifilament yarn(s) and/or fiber spun yarn(s) and/or monofilament yarn(s) has/have preferably a fineness greater than or equal to 10 dtex and less than or equal to 1,000 dtex, more preferably greater than or equal to 30 dtex and less than or equal to 500 dtex.

The at least partly hot-meltable yarn(s), particularly the single-component monofilament yarn(s), has/have a fineness included between 300 dtex and 900 dtex (bounds included), more particularly included between 400 dtex and 800 dtex (bounds included), in particular on the order of 600 dtex.

The multifilament yarn(s) may be one or several textured yarn(s) FDY (Full Drawn Yarn), DTY (Draw Textured Yarn) or POY (Partially Oriented Yarn), or a mixture thereof.

An at least partly hot-meltable yarn may be a yarn including at least two components A and B, in particular of the bi-component type, a first hot-meltable component A, particularly having a melting temperature lower than or equal to the heating temperature Tc during step iii), and a second non-hot-meltable component B particularly having a melting or degradation temperature higher than the heating temperature Tc during step iii).

A hot-meltable yarn may be a single-component yarn whose melting temperature is less than or equal to the heating temperature Tc during step iii).

Preferably, the at least one textile sole element includes of one or several at least partly hot-meltable yarn(s), and/or one or several at least partly non-hot-meltable in particular non-hot meltable yarn(s).

The at least partly hot-meltable yarn(s) according to the disclosure may include a first, particularly hot-meltable, component A chosen among thermoplastic elastomers; polyurethanes, in particular thermoplastic polyurethanes, in particular their elastomers; polyamides, such as polyamide 6 or 66; polyolefins, such as polypropylene (PP) or polyethylene (PE); preferably among polyurethanes.

The at least partly hot-meltable or at least partly non-hot-meltable or non-hot-meltable yarn(s) according to the disclosure may include a particularly non-hot-meltable component B within the meaning of the present text, chosen among polyolefins, such as high-density polyethylene, polyamides, such as polyamide 4-6, polyesters, such as polyethylene terephthalate.

The multifilament yarn(s) and/or the monofilament yarn(s) and/or the spun yarn(s), particularly non-hot-meltable or at least partly hot-meltable yarn(s) or whose overall melting or overall degradation temperature is higher than the heating temperature Tc in step iii), comprise(s) one or several material(s) chosen among a first list of synthetic compounds: polyesters, in particular polyethylene terephthalate; polyamides, such as PA 6, PA 66, PA 4-6, PA 12; polyolefins, such as polypropylene, polyethylene, PEEK, UHMWPE (very high molecular weight polyethylene); aramids, in particular meta-aramid or para-aramid, elastomers, in particular of polyesters or of polyurethane; or a mixture thereof; vinyl acetates; polyacrylics, such as polyacrylonitrile; elastomers; elastanes, or a mixture thereof; and/or a second list of compounds, particularly natural compounds or compounds derived from regenerated natural materials: cotton, viscose, linen, sisal, wool, jute, silk, hemp, and/or a third list of inorganic compounds: carbon, mineral fibres, such as rock fiber, glass, preferably carbon.

The yarn(s) according to the disclosure may also be elastic. The textile sole element may include one or several elastic yarn(s).

Preferably, the inflatable bladder is made of a polymer material able to inflate, and possibly deform, under the effect of an inflation pressure.

Preferably, the heating temperature (Tc) in step iii) is greater than or equal to 80° C. and less than or equal to 180° C., particularly between 100° C. and 160° C.

The heating temperature in step iii) and the pressure applied are determined as a function of the sole cavity of the mold and the thickness of the textile sole element(s) and optionally the auxiliary sole element(s).

Definitions

In the present text, we understand by "sole cavity" all of the negative and/or positive cavity/cavities disposed on the external face of the thermo-compressed textile sole element or disposed on an internal surface of the mold structure.

In the present text, we understand by "positive cavity" any element projecting outside (in particular towards the ground in use) the external face of the thermo-compressed textile sole element (in particular substantially corresponding to a negative cavity on an internal surface of the mold structure). It is for example a protrusion, such as a stud or a heel pad.

In the present text, we understand by "negative cavity" any element set back (in particular projecting towards the underside of the foot in use) from the external face of the thermo-compressed sole element (in particular substantially corresponding to a positive cavity on a internal surface of the mold structure). This is for example a recess in the external face, such as a slot.

In the present text, we understand by "at least partly hot-meltable" any yarn, particularly any polymer material, chosen in such a way as to melt at least partly, possibly substantially totally, during step iii) with thermo-compression above during which it is heated, and/or optionally in an independent thermo-bonding and/or thermoforming step. The term at least partly hot melted is used when the at least partly hot-meltable yarn(s) has/have been at least partly melted.

In the present text, we understand by "unitary textile construction" any element (piece, bootie, support, layer, etc.) in a single textile piece. The unitary piece may include seams or other attachment areas but they are used for its shaping and/or the finishing of its edges (and not for the addition of yoke(s)).

In the present text, we understand by "at least partly" of an element substantially all or part of this element.

In a first variant, the textile sole element includes a textile sole support having an external face, and one or several textile functional region(s) disposed, particularly in a spaced and located manner, on the external face of the textile sole support.

The textile sole support may include at least one knit as defined in the present text including one or several at least partly hot-meltable yarn(s) and/or one or several non-hot-meltable yarn(s).

Particularly, the textile functional region(s) are disposed set back and/or projecting from the external face of the textile sole support.

The functional region(s) may be formed during the knitting of the textile sole support or by deformation of the textile sole support, or be independent of the textile sole support. In the latter case, the functional region(s) is/are disposed in the mold structure between the external face of the textile sole support and the mold sole cavity, particularly facing the negative and/or positive cavity/cavities of the mold (that is to say intended to form one or several positive and/or negative cavity/cavities respectively on the external face of the sole structure and/or on the external face of the at least one textile sole element).

Preferably, the sole support, and the functional textile region(s) are of unitary textile, in particular knitted, construction.

In one sub-variant, the textile functional region(s) is/are one or several textile pocket(s).

Preferably, the textile pocket(s) are formed during the manufacture, in particular during the knitting, of the textile sole support.

In a second variant, the textile sole element includes a textile sole support having an external face, and a continuous or discontinuous textile layer, including one or several at least partly hot-melt yarn(s), disposed along the external face of the textile sole support.

The continuous or discontinuous textile layer may be independent of the sole support or be of textile construction unitary with the textile sole support, in particular of knitted construction unitary with the textile sole support.

The textile sole support and the textile layer may be or include a knit or several substantially superimposed knits, in particular two substantially superimposed knits.

The textile sole support and/or the continuous or discontinuous textile layer and/or the functional textile region(s) in the present text comprise(s) one or several yarn(s) as defined in the present text.

In one sub-variant, the continuous or discontinuous textile layer includes a section having a thickness $e_i$ in step i) and a thickness $e_f$ in step iv), $e_i$ being different from $e_f$.

The thickness $e_i$ is greater or smaller than the thickness $e_f$ in the section. Preferably, the thickness $e_i$ is greater by at least 20% than the thickness $e_f$ ($e_i \leq 1.20 * e_f$).

During step iii), the melted material derived from the melting of the at least partly hot-melt yarn(s) flows and fills the sole cavity of the mold. The thickness $e_f$ is therefore preferably reduced after the thermo-compression step iii).

In a third variant, the ratio of the mass of the hot melted material derived from the at least partly hot-meltable yarn(s) in the at least one textile sole element to the total mass of the at least one textile sole element is greater than or equal to 50%, preferably greater than or equal to 80%.

In one variant, the ratio of the mass of the hot melted material derived from the at least partly hot-meltable yarn(s) in the textile sole support to the total mass of the textile sole support is greater than or equal to 30%, preferably greater than or equal to 50%, more preferably greater than or equal to 60%, preferably greater than or equal to 70%, in particular greater than or equal to 80%, for example on the order of 90%.

In one variant, the ratio of the mass of the hot melted material derived from the at least partly hot-meltable yarn(s) in the functional textile region(s) to the total mass of the functional textile region(s) is greater than or equal to 30%, preferably greater than or equal to 50%, more preferably greater than or equal to 60%, preferably greater than or equal to 70%, in particular greater than or equal to 80%, for example on the order of 90%.

In one variant, the ratio of the mass of the hot melted material derived from the at least partly hot-meltable yarn(s) in the continuous or discontinuous textile layer to the total mass of the continuous or discontinuous textile layer, is greater than or equal to 30%, preferably greater than or equal to 50%, more preferably greater than or equal to 60%, preferably greater than or equal to 70%, in particular greater than or equal to 80%, for example on the order of 90%.

In a fourth variant, the textile sole element is of unitary textile construction.

In a fifth variant, the sole structure is an outsole, particularly the outsole includes one or several fully or partly hot melted textile studs.

In a sixth variant, the at least one textile sole element is a textile envelope including a textile sole portion and a foot wrapping peripheral, particularly textile, portion.

Preferably, the peripheral portion for partially wrapping the foot (in particular including one or several at least partly hot-meltable yarn(s) extends substantially vertically from the sole portion.

In one embodiment, the peripheral portion for partially wrapping the foot includes a front portion and/or a rear portion and/or a lateral portion and/or a medial portion, the portion(s) projecting substantially vertically from the internal face of the textile sole element or from the internal face of the textile sole portion. Preferably, the at least partly hot melted textile rear portion (after step iii)) forms a counter. Preferably, the at least partly hot melted textile front portion (after step iii)) forms a hard toe-puff.

In another variant, the at least one textile sole element includes a textile sole portion (in particular including one or several at least partly hot-meltable yarn(s)) having lateral and medial edges, the textile sole element further includes one or several textile branches (in particular including one or several at least partly hot-meltable yarn(s)) projecting substantially vertically from the textile sole portion, particularly one or several textile lateral branch(es) projecting from the lateral edge of the sole portion and/or one or several medial branch(es) projecting from the medial edge of the sole portion. Preferably, the textile branch/branches comprise(s) each one or several first end(s) in connection with the lateral or medial edge of the textile sole portion and one or several second, in particular free, end(s). The second end(s) comprise(s) each a through-aperture, in particular an eyelet, for example for the passage of an elongate element, for example a shoelace.

The variants of embodiment, definitions and embodiments with reference to the first aspect may be combined independently of each other.

The present disclosure relates, according to a second aspect, to a footwear including a sole structure capable of being obtained by the method according to any one of the variants of embodiment with reference to the first aspect of the disclosure.

The footwear preferably includes an upper in connection with the sole structure, more preferably the upper includes at least one textile bootie, in particular of unitary textile construction. The textile bootie of the upper may include one or several in particular at least partly hot melted yarn(s) as defined in the present text. Preferably, the textile bootie is thermo-compressed.

The present disclosure relates, according to a third aspect, to a method for manufacturing a footwear, including the implementation of the method for manufacturing a sole structure according to any one of the variants of embodiments with reference to the first aspect of the disclosure, and including the provision of a main textile bootie including one or several at least partly hot-meltable yarn(s). The main textile bootie undergoes a thermoforming step, particularly a thermo-compression step, in particular taking place during step iii) or independently of step iii), for example before or after step iii). The thermoforming includes a step of heating the main bootie and/or the auxiliary bootie, particularly disposed on a (flexible or rigid) preform in the shape of a foot, allowing the melting of the at least partly hot-meltable yarn(s) in order to set the shape of the upper including the main bootie and optionally the at least partly hot melted auxiliary bootie. The shape of the upper may thus be set without resorting to the application of a pressure.

In one embodiment, when the thermo-compression of the main textile bootie takes place during step iii), the textile sole element and the main textile bootie are thermo-compressed together, and therefore also thermoformed, at the same time. This disposition allows attaching the main textile bootie with the textile sole element during step iii) when they are independent.

In one embodiment, when the thermo-compression of the main bootie takes place independently of step iii):
the main bootie may be thermo-compressed independently of the textile sole element, then assembled with the sole structure, in particular by bonding or thermo-bonding, by sewing or any equivalent technique; or
the main bootie may be thermo-compressed with the sole structure including the at least one thermo-compressed sole element (which also allows the attachment of the sole structure with the main bootie).

Preferably, the footwear in the present text includes a longitudinal axis L extending substantially between the back and the front of the article. The footwear also includes a transverse axis T, in particular substantially perpendicular to the longitudinal axis, L and extending between the medial edge and the lateral edge of the footwear).

Main Textile Bootie, Auxiliary Textile Bootie (Described Below)

Preferably, the main textile bootie, and/or the auxiliary textile bootie, is/are each a textile, in particular knitted, envelope including a sole portion (covering entirely or partly the underside of the foot of the wearer of the footwear); a lateral portion (covering entirely or partly the lateral side of the foot of the wearer of the footwear); a medial portion (covering entirely or partly the medial side of the foot of the wearer of the footwear); a front portion, in particular in the extension of the lateral, medial and sole portions (covering entirely or partly the front of the wearer's foot); and a rear portion, in particular in the extension of the medial, lateral and sole parts (intended to cover entirely or partly the back of the wearer's foot).

The main bootie and/or the auxiliary bootie each comprise(s) an interior volume, in particular corresponding, at least entirely or partly, to the volume for receiving or accommodating the foot in the footwear.

Preferably, the main textile bootie is of unitary textile, particularly knitted or woven, in particular knitted, construction.

The main textile bootie and/or the auxiliary textile bootie includes one or several yarn(s) as defined in the present text, in particular one or several at least partly hot-meltable yarn(s) and/or one of the at least partly non-hot-meltable or non-hot-meltable yarn(s).

The textile sole element may be independent of the main textile bootie. During step iii), the textile sole element is disposed between the sole cavity of the mold structure on the one hand, and the main textile bootie on the other hand, in particular its sole portion. In this case, the textile sole element may come into contact directly with the sole cavity of the mold.

In a first variant, the at least one textile sole element is of unitary textile construction with the main textile bootie.

In one embodiment, the at least one textile sole element includes the sole portion of the main bootie. In this case, the internal face of the sole portion of the main bootie is the internal face of the textile sole element, in particular of its sole portion, and the external face of the sole portion of the main bootie is the external face of the textile sole element, in particular of its sole portion.

In a second variant, the at least one textile sole element is a textile envelope including a sole portion and a peripheral portion for partially wrapping the foot.

In one embodiment, the peripheral portion for partially wrapping the foot includes a front portion and/or a rear portion and/or a lateral portion and/or a medial portion, the portion(s) projecting substantially vertically from the external face of the textile sole element, in particular from the external face of its sole portion. Preferably, the at least partly hot melted textile rear portion (after step iii)) forms a counter. Preferably, the at least partly hot melted front textile portion (after step iii)) forms a hard toe-puff.

In one embodiment, the textile envelope, or the sole structure including the thermo-compressed textile envelope, is disposed in the mold structure between the sole cavity of the mold structure and the main textile bootie, particularly the sole part of the main textile bootie. In this case, the textile sole element does not come into contact directly with the sole cavity of the mold.

In one variant, the at least one thermo-compressed textile sole element includes a textile sole portion (in particular at least partly hot melted, and optionally thermo-compressed) having lateral and medial edges, the textile sole element further includes one or several textile branches (in particular at least partly hot melted and optionally thermo-compressed) projecting substantially vertically from the textile sole portion, particularly one or several lateral textile branch(es) projecting from the lateral edge of the sole portion and/or one or several medial branch(es) projecting from the medial edge of the sole portion. Preferably, the branch(es) comprise(s) each one or several first end(s) in connection with the lateral or medial edge of the textile sole portion and one or several second, in particular free, end(s). The second end(s) comprise(s) each a through-aperture, in particular an eyelet, for example for the passage of an elongate element, for example a shoelace.

In a third variant, the method includes the provision of an auxiliary textile bootie including one or several at least partly hot-meltable yarn(s) having a volume for accommodating the foot receiving, at least partly, the main textile bootie.

In one embodiment, the auxiliary textile bootie undergoes a thermoforming, in particular a thermo-compression, step, in particular taking place during step iii) or independently of step iii), for example before or after step iii). The melting of the at least partly hot-meltable yarn(s) allows forming the upper.

In one embodiment, when the thermo-compression of the auxiliary textile bootie takes place during step iii), the textile sole element, the main textile bootie and the auxiliary bootie, are thermo-compressed together, and in particular thermoformed at the same time. This disposition allows attaching the textile sole element, on the one hand to the main textile bootie, and on the other hand to the auxiliary bootie, as well as the main and auxiliary booties together.

In one embodiment, when the thermo-compression of the auxiliary bootie takes place independently of step iii):
the auxiliary bootie may be thermo-compressed independently of the textile sole element, and independently or at the same time as the main bootie, then assembled with the sole structure, in particular by bonding or heat-bonding, by sewing or any equivalent technique; or
the auxiliary bootie and the main bootie may be thereto-compressed together with the sole structure including the thereto-compressed sole element (which also allows the attachment of the sole structure with the main bootie and the auxiliary bootie as well as the shaping of the upper).

Preferably, when the auxiliary bootie and the main bootie are thermoformed together, in particular thermo-compressed, they are at least partly superimposed, the at least one textile sole element being disposed between the auxiliary bootie and the main bootie.

In one embodiment, the auxiliary bootie is of unitary textile, particularly knitted or woven, in particular knitted, construction. Particularly, the auxiliary bootie and the main bootie are two independent textile pieces.

In one embodiment, the auxiliary textile bootie and the main textile bootie are of unitary textile, in particular knitted, construction for example in a single textile, in particular knitted, piece. The textile piece may be generally substantially L-shaped or U-shaped. Preferably, the auxiliary bootie and the main bootie are in textile, in particular knitted, connection at their apertures for introducing the foot into their respective interior volumes.

In one variant of embodiment, the sole portion of the main textile bootie and/or the sole portion of the auxiliary textile bootie comprise(s) one or several at least partly hot-meltable yarn(s).

In a fourth variant, the sole structure in step iv) includes a hot melted textile material of the at least partly hot melted main textile bootie and/or a hot melted textile material of the at least partly hot melted auxiliary bootie.

The present disclosure relates, according to a fourth aspect, to a sole structure for a footwear, in particular capable of being obtained by the method for manufacturing a sole structure according to any one of the variants of embodiment with reference to the first aspect of the disclosure, including at least one, at least partly, hot melted textile sole element, having substantially opposite internal and external faces, the external face of the textile sole element includes a sole cavity, and the textile sole element has a variable thickness.

Advantageously, the at least partly hot melted, in particular thermo-compressed textile sole element, is not obtained by embossing of a textile layer and therefore does not have a substantially constant thickness corresponding to the thickness of the textile layer.

Particularly, the external face of the textile sole element includes an at least partly, or substantially totally, hot melted textile sole cavity.

Advantageously, a positive or negative cavity along the external face is not formed by a corresponding (negative or positive respectively) deformation along the internal face of the textile sole element. The textile sole element is therefore more resistant to abrasion and mechanically to deformation (flexural and/or extensional deformation).

For example, the at least partly hot melted textile sole element has a thickness $e_1$ in a section including a positive cavity projecting from its external face which is greater than a thickness $e_2$ in a section including a negative cavity set back from its external face.

Preferably, the basic thickness $e_0$ of the textile sole element corresponds to the thickness in a section including neither negative cavity nor positive cavity along the external face of the textile sole element.

Preferably, the ratio of the filled volume of the at least partly hot melted at least one textile sole element, relative to its total volume is greater than or equal to 80%, preferably greater than or equal to 90%.

In one embodiment, the at least partly hot melted textile sole element includes a sole portion extending substantially between a rear edge and a front edge, and between a lateral edge and a medial edge. Preferably, the rear and front edges substantially correspond to the rear and front edges of the footwear including the sole structure. Preferably, the medial and lateral edges correspond substantially to the lateral and medial edges of the footwear including the sole structure.

In a first variant, the sole cavity includes at least one negative or positive cavity, and the internal face of the textile sole element includes at least one region facing the negative or positive cavity which is substantially planar.

It is understood by substantially planar region that the region does not include any recess or hollow.

The internal face of the sole element may have a globally non-planar shape, but include at least one region disposed locally substantially facing a negative or positive cavity on the internal face which is planar.

For example, when the sole element forms an outsole including front and rear parts, the front part may be slightly raised relative to the rear part. Indeed, the outsole may go up on the upper at the tip of the foot of the upper.

In a second variant, the thickness ($e_1$) of the textile sole element in a section including a positive cavity is greater than the thickness ($e_2$) of the textile sole element in a section including a negative cavity.

In a third variant, the ratio of the mass of the hot melted textile material in the textile sole element to the total mass of the textile sole element is greater than or equal to 50%, preferably greater than or equal to 80%.

In a fourth variant, the textile sole element is an outsole, optionally including one or several at least partly hot melted textile stud(s).

The present disclosure relates, according to a fifth aspect, to a footwear including a sole structure, according to any one of the variants of embodiment with reference to the fourth aspect of the disclosure.

In a first variant, the footwear includes an at least partly hot melted main textile bootie.

In a second variant of embodiment, the textile sole element is of unitary textile construction with the main textile bootie.

In a third variant of embodiment, the at least partly hot melted textile sole element is a textile envelope including a sole portion and a peripheral portion for partially wrapping the foot.

In one embodiment, the at least partly hot melted textile sole element includes one or several branch(es) projecting substantially vertically from a lateral edge and/or from a medial edge of the sole portion of the textile sole element. Preferably, the branch(es) is/are one or several textile, in particular lateral and/or medial, branch(es) including one or several yarn(s) as defined according to the present text, particularly one or several at least partly hot-meltable yarn(s) so that it is/they are at least partly hot melted.

Preferably, the branch(es) comprise(s) a first end in connection with the lateral or medial edge, and a second, optionally free, end.

The second end(s) of the lateral branch(es) converge(s) towards the second end(s) of the medial branch(es).

The second end(s) may include a through-aperture, such as a passage eyelet, for the passage of an elongate element, for example a shoelace.

In a fourth variant of embodiment, the footwear includes an at least partly hot melted auxiliary textile bootie and having a volume for accommodating the foot receiving, at least partly, the main textile bootie.

In a variant of embodiment, the textile sole element includes a hot melted textile material of the main bootie, and/or a hot melted textile material of the auxiliary bootie.

In one variant of embodiment, the footwear includes at least one, at least partly, hot melted textile viewing window, in particular including one or several at least partly hot-melted transparent or opaque yarn(s).

The main bootie or the auxiliary bootie or the textile sole element according to the disclosure may include one or several at least partly hot melted textile viewing window(s).

For example, the auxiliary bootie includes an at least partly hot melted textile viewing window disposed substantially facing a portion of the main bootie. The main bootie is therefore visible from the outside of the footwear through the window.

The variants of embodiment, definitions, embodiments, with reference to the first and/or second and/or third and/or fourth and/or fifth aspect(s) of the disclosure may be combined together, independently of each other, unless otherwise specified.

Preferably, in the present text, the expression hot-meltable is used for an element before its hot melting (which may be obtained during a thermoforming step or a thermo-compression step) with reference to the method for manufacturing a sole structure or a footwear, and the expression hot melted is used for this same element after its hot melting with reference to the sole structure or to the footwear obtained.

Preferably, the footwear and/or the sole structure, according to the disclosure, is/are a footwear and/or a sole structure for the practice of sport, for example (and without limitation): soccer, basketball, hiking, running, cycling, . . . .

DESCRIPTION OF THE DRAWINGS

The disclosure will be better understood upon reading the description of the embodiments of the disclosure given by way of non-limiting examples, with reference to the appended drawings, in which.

DETAILED DESCRIPTION

Figure 1:
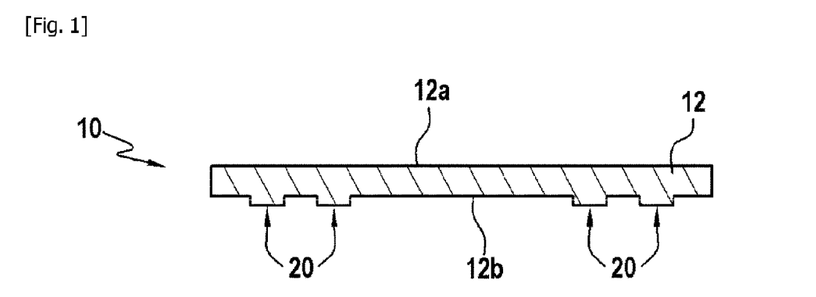
FIG. 1 schematically illustrates a side view of a first example of a textile sole element, before thermo-compression, according to the disclosure.

The first example of a textile sole element 10 represented in FIG. 1 includes a textile sole support 12 having substantially opposite internal 12a and external 12b faces, and textile functional regions 20 projecting from the external face 12b. Preferably, the textile functional regions 20 and the sole support 10 are of unitary textile construction. The textile sole support 12 and the textile functional regions 20 each include one or several at least partly hot-meltable yarn(s).

Figure 2:
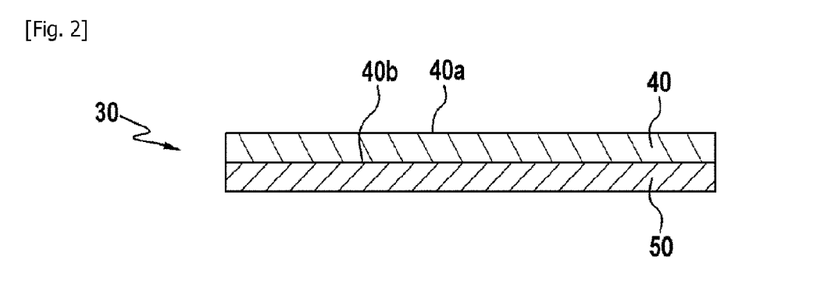
FIG. 2 schematically illustrates a side view of a second example of a textile sole element, before thermo-compression, according to the disclosure.
Figure 3:
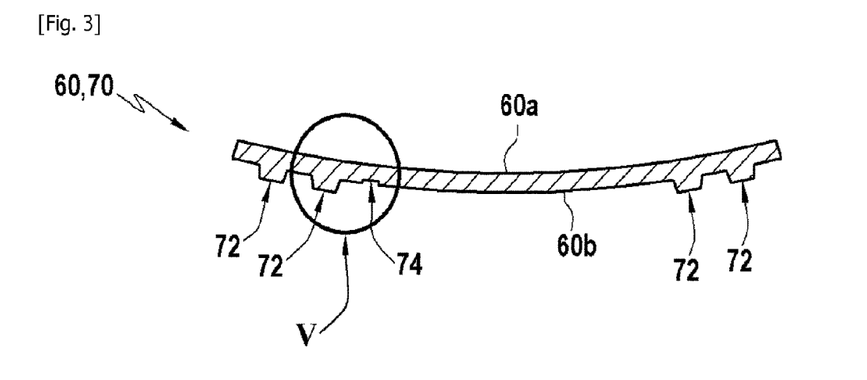
FIG. 3 schematically represents a side view of a first example of a sole structure including the first example or the second example of a thermo-compressed textile sole element.
Figure 4:
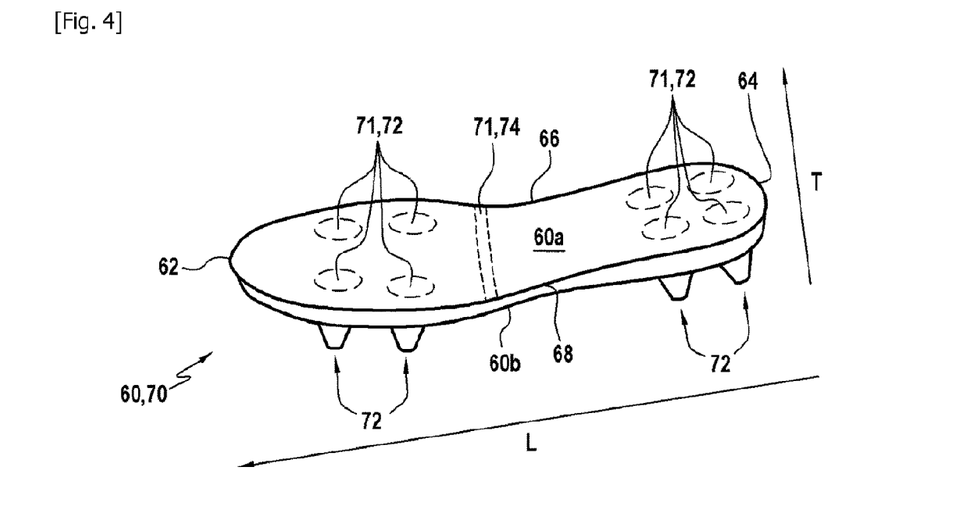
FIG. 4 schematically represents a substantially perspective top view of the first example of a sole structure represented in FIG. 3.

The second example of a textile sole element 30 includes a textile sole support 40 having substantially opposite internal 40a and external 40b faces, and a textile layer 50, in this specific example continuous, disposed on the external face 40b. Preferably, the textile sole support 40 and the textile layer 50 are of unitary textile construction, and each include one or several at least partly hot-meltable yarn(s). The textile layer 50 may include more at least partly hot-meltable yarns than the sole support 40. When they are of unitary textile construction, it is possible to differentiate in the thickness of the textile the distribution of the the least partly hot-meltable yarns.

In these examples, the textile sole elements 10 and 30 are each a knit of unitary knitted construction. It is possible, however, that the textile sole elements are each combined with one or several other auxiliary, in particular textile or not, sole elements, for example one or several polymer film(s) and/or one or several molded functional piece(s), for example made of foam and/or one or several reinforcing piece(s).

Figure 5:
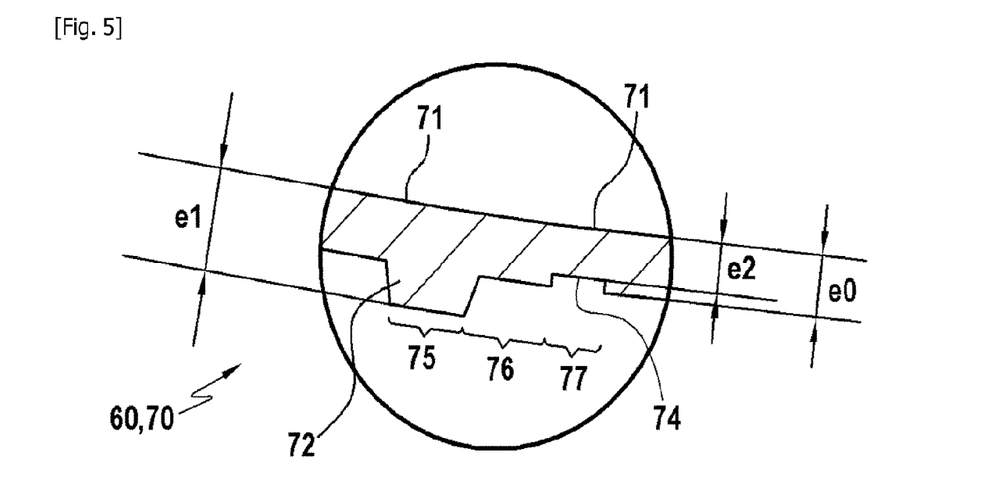
FIG. 5 schematically represents a side view of the sections of the sole structure represented in FIGS. 3 and 4.
Figure 6:
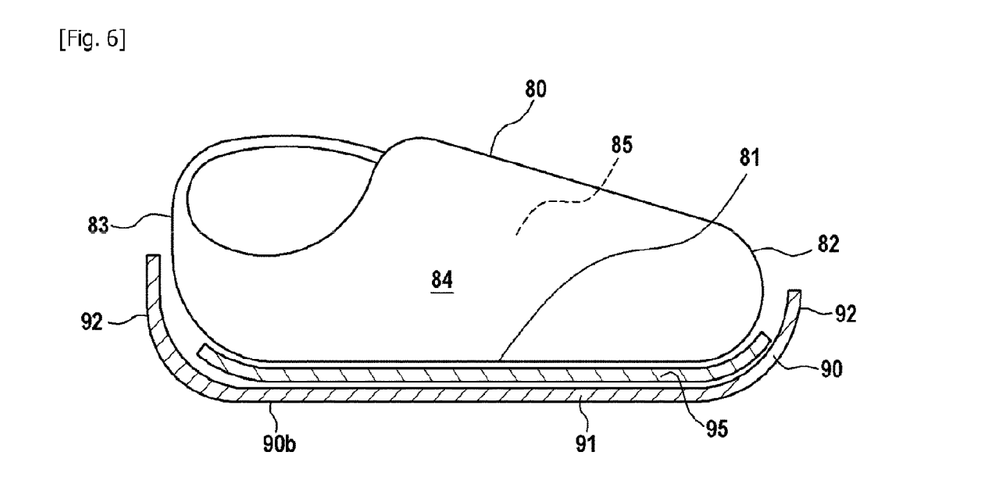
FIG. 6 schematically illustrates a side view of a first example of a main textile bootie associated with a third example of a textile sole element, and another sole element, before thermo-compression.

The sole structure 60 includes the thermo-compressed textile sole element 10 or 30 according to the same sole cavity of a given mold structure. The sole structure 60 is in this specific example, an outsole 70, and includes substantially opposite internal 60a and external 60b faces. The sole structure 60 includes eight positive cavities 72, in particular studs and a negative cavity 74, in particular a transverse slot making it possible to soften the outsole 70. The sole structure 60 has a longitudinal axis L extending substantially between the front edge 62 and the rear edge 64, and a transverse axis T extending substantially between the medial edge 66 and the lateral edge 68. The axes T and L are secant, and may be substantially perpendicular. It is noted in the figures that the sole structure 60 has a full volume. Furthermore, the regions 71 of the internal face 60a of the sole structure 60 substantially facing the positive cavities 72 and the negative cavity 74 are substantially planar. In FIG. 5, the section 75 of the thermo-compressed textile sole element 70 includes the positive cavity 72 and has a thickness $e_1$. The section 76 of the thermo-compressed textile sole element 70, without positive or negative cavity, has a base thickness $e_0$. The section 77 of the thermo-compressed textile sole element 70, including the negative cavity 74, has a thickness $e_2$. The thickness of the thermo-compressed sole element 70 is therefore variable, particularly $e_1$ is greater than $e_2$. FIG. 6 represents one variant of an assembly to be thermo-compressed to form an upper and a sole structure of a footwear. The assembly includes a main textile bootie 80 having an internal foot-receiving volume and including one or several at least partly hot-meltable yarn(s). The main bootie 80 includes a sole portion 81, a front portion 82, a rear portion 83, and lateral 84 and medial 85 portions. The assembly also includes a third example of a textile sole element 90 in the form a textile envelope, and partly receiving the main bootie 80. The textile sole element 90 includes a sole portion 91 and a peripheral portion for partially wrapping the foot 92. The peripheral portion for partially wrapping the foot 92 extends substantially vertically from the sole portion 91, at least partly along the front and rear edges, and the lateral and medial edges of the sole portion 91.

It is possible to arrange another auxiliary sole element which is an intermediate piece 95 between the sole portion 81 of the main bootie 80 and the sole part 91 of the textile sole element 90, for example a polymer film to provide a reinforcing function. The assembly intended to be thermo-compressed to form the sole structure thus includes the textile sole element 90, the intermediate piece 95 and possibly at least partly the sole portion 81 of the bootie 80. The assembly intended to form the footwear, including the main bootie 80, the textile sole element 90 and the intermediate piece 95, undergoes a thermo-compression step during which an inflatable bladder is disposed in the internal volume of the main bootie 80, then the assembly is disposed in a mold structure, the inflatable bladder is inflated so as to push the external face 90b of the textile sole element 90 against the sole cavity of the mold structure. Then, the assembly is heated to a heating temperature Tc in order to melt the hot-meltable material(s), in particular of the at least partly hot-meltable yarn(s). The hot melted material fills the sole cavity and thus forms a corresponding at least partly hot melted textile sole cavity on the external face of the thermo-compressed and at least partly hot melted textile sole element 90.

Figure 7:
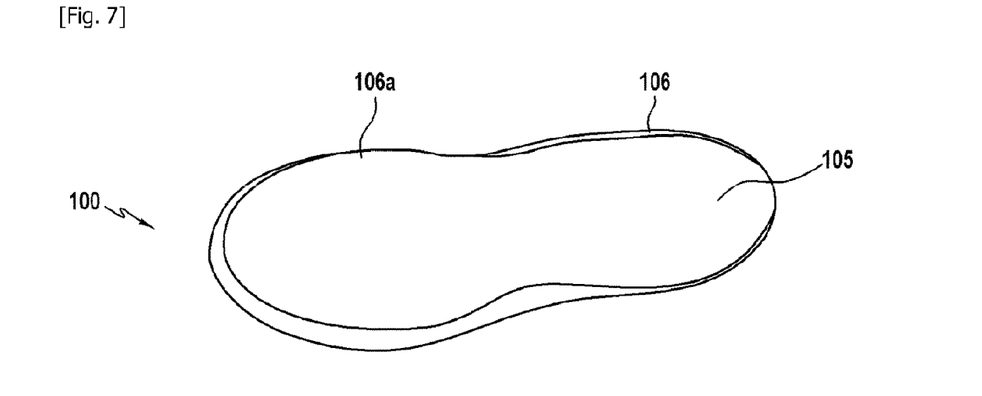
FIG. 7 schematically illustrates a top view of a second example of a sole structure including the third example of a textile sole element represented thermo-compressed in FIG. 6.
Figure 8:
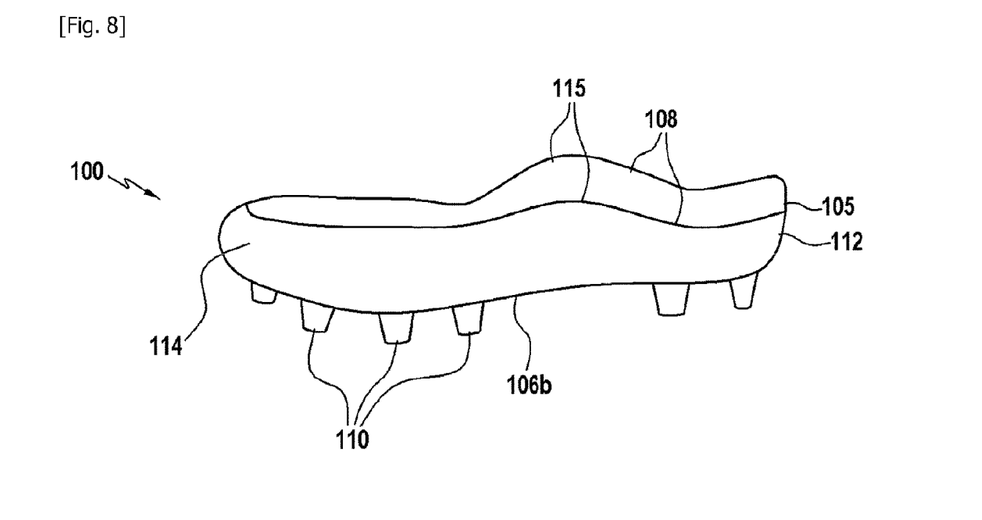
FIG. 8 schematically illustrates a side view of the second example of a sole structure represented in FIG. 7.

FIGS. 7 and 8 represent a second example of a sole structure 100 which is obtained by the thermo-compression only of the textile sole element 90 represented in FIG. 6. This sole structure 100 is preferably an outsole. The thermo-compressed textile sole element 105 includes a sole portion 106 having substantially opposite internal 106a and external 106b faces as well as a partial foot-wrapping portion 108 extending substantially vertically from the sole portion 106. As may be seen in FIG. 7, the internal face 106a of the sole portion 106 is substantially planar implicitly because of the substantially smooth surface of the inflatable bladder implemented. Furthermore, the sole structure 100 includes positive cavities 110 projecting from the external face 106b. Advantageously, the sole structure 100 includes via the at least partly hot melted wrapping portion 108 a counter 112 and a front hard toe-puff 114 as well as lateral holding wings 115.

Figure 9:
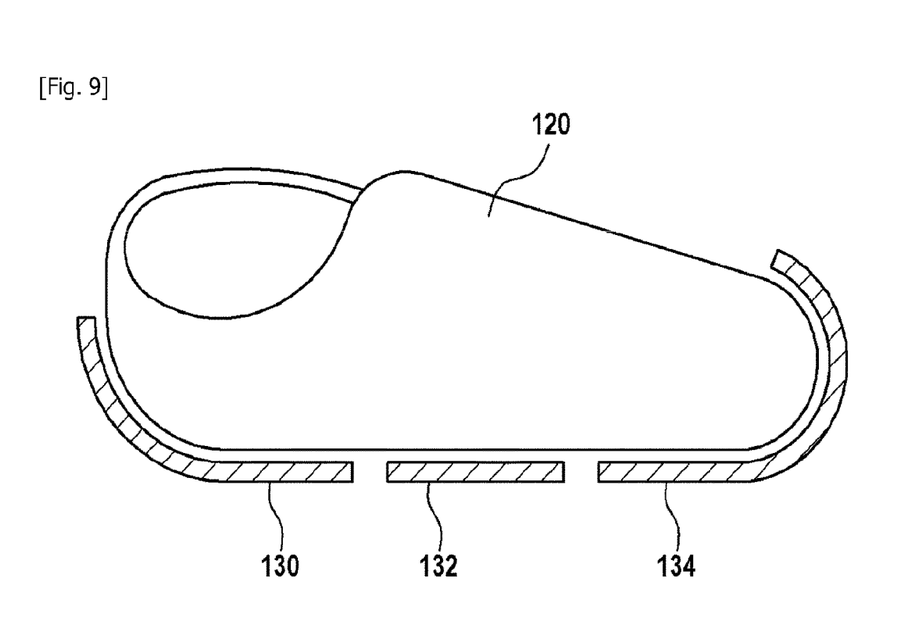
FIG. 9 schematically illustrates a side view of a second example of a main textile bootie associated with three textile sole elements according to a fourth example, before thermo-compression.

FIG. 9 represents an assembly intended to form a footwear after at least one thermo-compression step including a second example of a main textile bootie 120 associated with three textile sole elements 130, 132 and 134. The three textile sole elements 130, 132 and 134 are independent and form together substantially a textile envelope similar to the textile envelope 90 of FIG. 6. Preferably, the main bootie 120, the textile sole elements 130, 132, 134 including, in particular each, one or several at least partly hot-meltable yarn(s).

Figure 10:
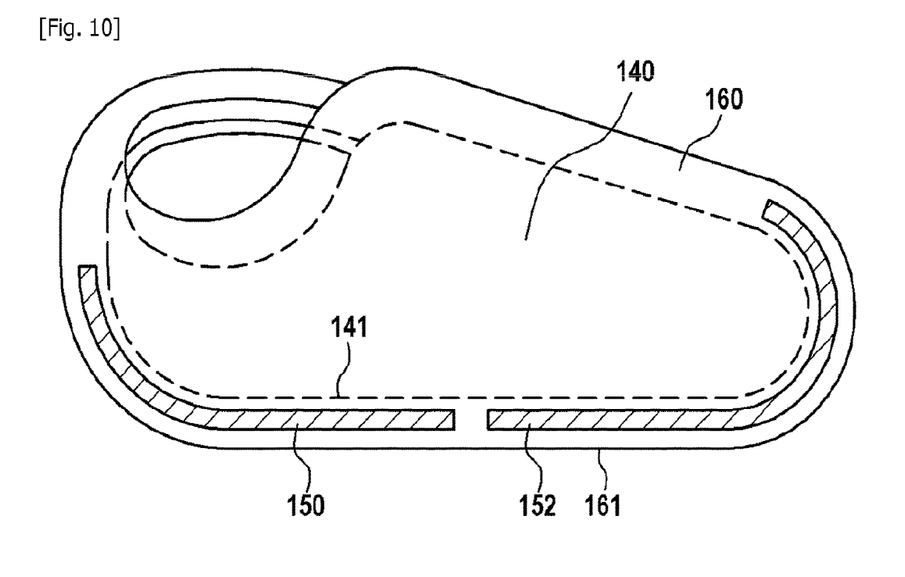
FIG. 10 schematically illustrates a side view of a third example of a main textile bootie, a first example of an auxiliary textile bootie, and two textile sole elements according to a fifth example, before thermo-compression.

FIG. 10 represents an assembly intended to form a footwear after at least one thermo-compression step including a third example of a main textile bootie 140 associated with two textile sole elements 150 and 152 and an auxiliary textile bootie 160. The two textile sole elements 150 and 152 are independent and form together substantially a textile envelope similar to the textile envelope 90 in FIG. 6. Preferably, the auxiliary bootie 160, the main bootie 140 and the textile sole elements 150, 152, including, in particular each, one or several at least partly hot-meltable yarn(s). The two sole elements 150, 152 are disposed in the extension of each other and at least between the sole portion 141 of the main bootie 140 and the sole portion 161 of the auxiliary bootie 160. In this case, the thermocompression of the assembly intended to form the footwear, includes the at least partly hot melted, in particular also thermo-compressed, main 140 and auxiliary 160 booties. The sole structure includes, at least partly, the sole portion 161 of the least partly hot melted (in particular thermo-compressed) auxiliary bootie 160, the at least partly hot melted (in particular thermo-compressed) textile sole elements 150, 152, and possibly at least partly the sole portion 141 of the main bootie 140. The sole portion of the main bootie may be constructed, particularly during knitting, so as to have a significant thickness, for example include looped stitches, and be partially hot-meltable so that a mat of non-hot melted yarns remains to provide comfort.

Figure 11:
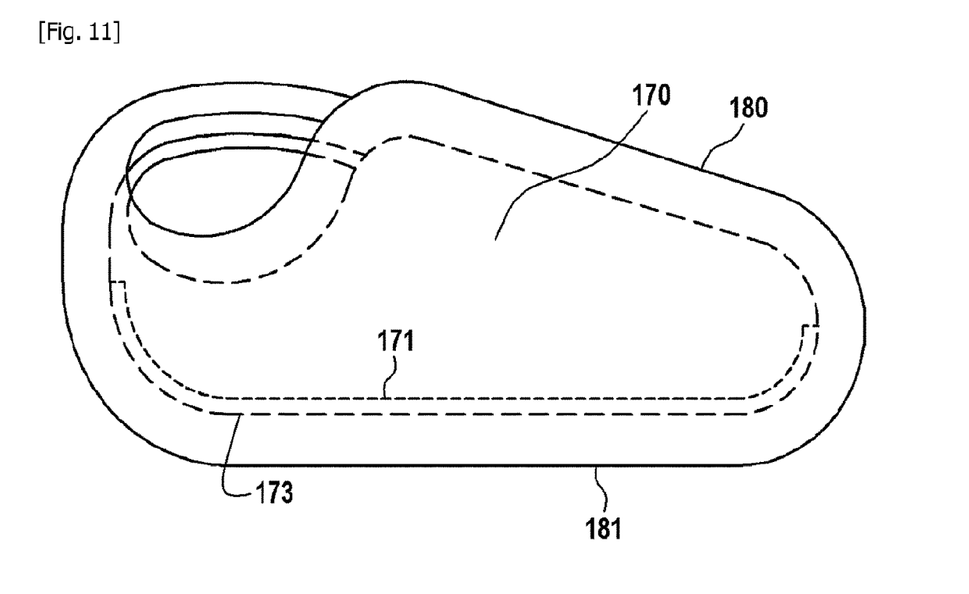
FIG. 11 schematically illustrates a side view of a fourth example of a main textile bootie, a second example of an auxiliary textile bootie, and a sixth example of a textile sole element of textile construction unitary with the main bootie, before thermo-compression.

FIG. 11 represents an assembly intended to form a footwear after at least one thermo-compression step (iii) including a main textile bootie 170, an auxiliary textile bootie 180 and a textile sole element 173 of textile, in particular knitted, construction unitary with the sole portion 171 of the main bootie 170. The assembly could include another textile sole element of textile construction unitary with the sole portion of the auxiliary bootie. In this specific example, the sole portion 171 has a textile construction configured such that it includes at least two thicknesses or textile layers. The textile sole element 173 could alternatively be formed from the sole portion 181 of the auxiliary bootie 180. In practice, after thermocompression of the assembly, the sole structure includes the at least partly hot melted and thermo-compressed sole portion 181, the at least partly hot melted and thermo-compressed textile sole element 173, and the at least partly hot melted and thermo-compressed sole portion 171.

Figure 12:
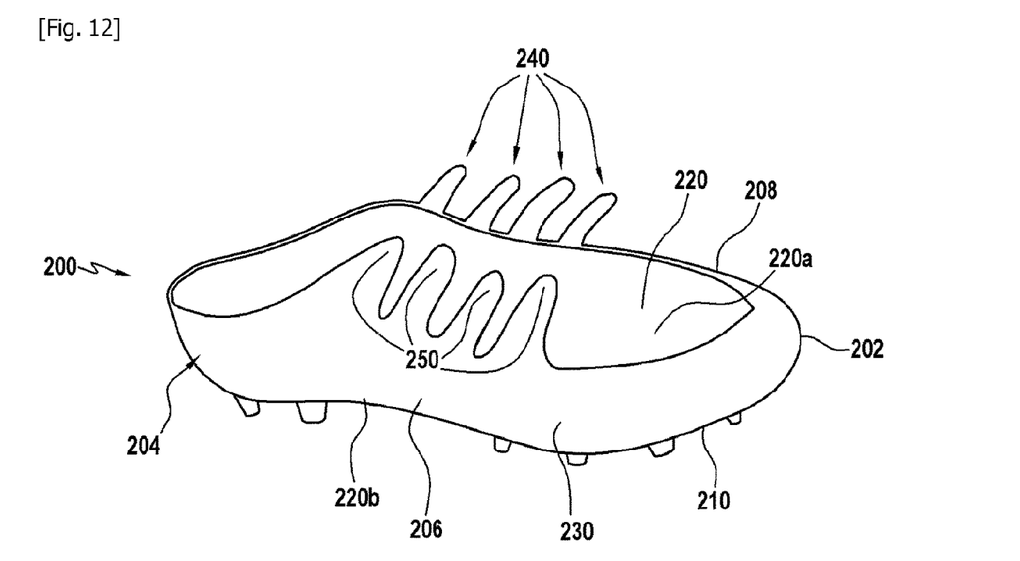
FIG. 12 schematically illustrates a perspective view of a third example of a sole structure including a textile sole element according to a seventh example which is thermo-compressed.

FIG. 12 represents a third example of a sole structure 200 alone including at least one at least partly hot melted 210 and thermo-compressed textile sole element including a sole portion 220 having substantially opposite internal 220a and external 220b faces, and an at least partly hot melted and thermo-compressed peripheral portion for partially wrapping the textile foot 230, particularly extending substantially vertically from the sole portion 220 and along the front 202, rear 204, medial 206 and lateral 208 edges. The sole structure 200 further includes four lateral 240 and four medial 250 branches projecting respectively along the peripheral wrapping portion 230 along respectively the lateral 208 and medial 206 edges. The branches 240, 250 each include first ends in connection with the wrapping portion 230, and second, in particular free, ends. The second ends of the lateral branches 240 converge towards the second ends of the medial branches 250. In this specific example, the wrapping portion 230 forms a sort of shell delimiting a partial accommodating volume for the foot and including a hard toe-puff and a rear counter. The sole structure 200 thus provides reinforcement to the upper of a footwear via the branches 240, 250. The second free ends may also each include a through-aperture, such as an eyelet, for example for the passage of an elongate element (example a shoelace). The sole structure 200 may be obtained by means of the superposition of several textile sole elements, at least one of which has a shape similar to that of the textile envelope 90 with lateral and medial textile branches. The branches may be formed by knitting or by cutting in at least one textile sole element. When the footwear is manufactured using at least one textile bootie according to the disclosure, it is possible that these branches result from the local disposition of hot-meltable yarns on the lateral and medial portions of the (main and/or auxiliary) bootie.

Figure 13:
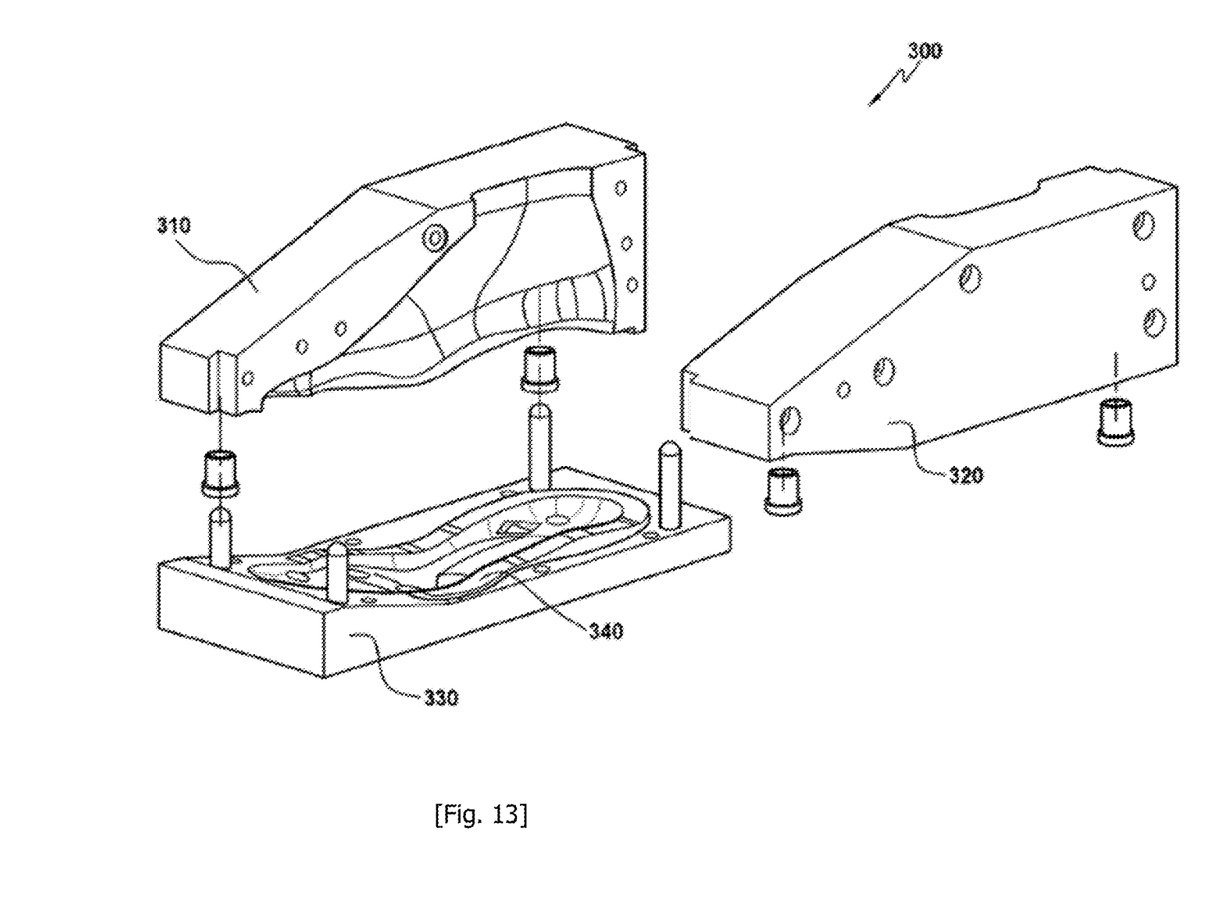
FIG. 13 schematically illustrates a perspective view of a first example of a mold structure according to the disclosure.
Figure 14:
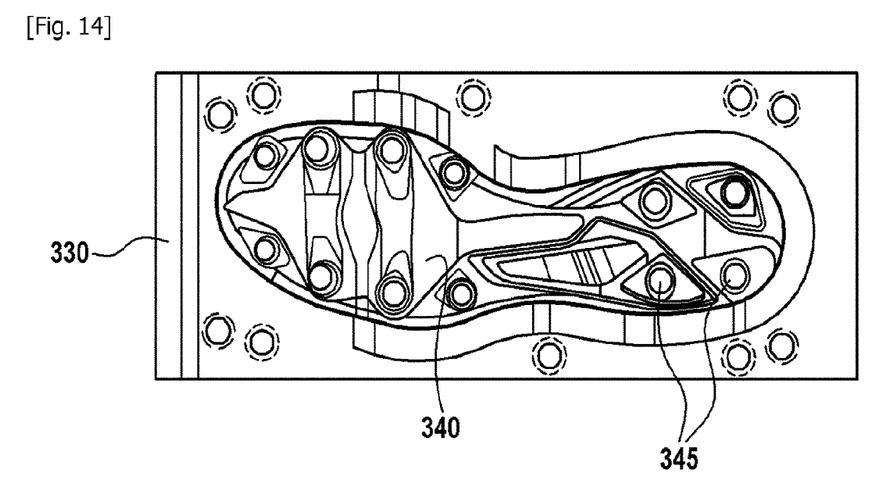
FIG. 14 schematically illustrates a top view of a first example of a sole cavity of the mold structure of FIG. 13.
Figure 15:
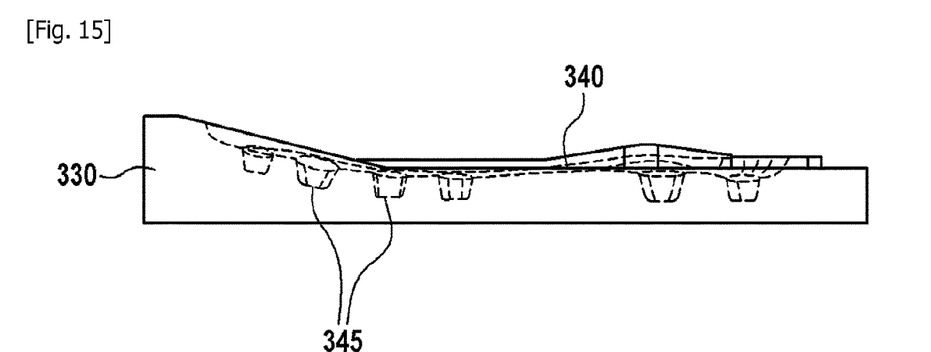
FIG. 15 schematically illustrates a side view of the first example of a sole cavity of the mold structure of FIG. 13.

FIG. 13 represents a first example of a mold structure 300 including left 310 and right 320 upper parts, and a lower part 330. The lower part 330 includes a sole cavity 340, which is seen from above in FIG. 14 and from the side in FIG. 15. The sole cavity 340 includes in this example negative cavities 345, which form positive cavities on the external face of at least one thermo-compressed textile sole element.

Generally, the yarn(s) in the embodiments above is/are as defined in the present text.

The method according to the disclosure advantageously allows manufacturing in a simplified manner, in particular via a single step of hot-forming and press-forming, a sole structure or a footwear including an upper and a sole structure. It is possible to locally functionalize without limit the sole structure or the footwear in a simplified manner according to the disposition and the type of yarn(s) (melt-type, color, material, etc.) implemented. In addition, it is possible to manufacture in a single hot-forming and press-forming step, an entire footwear, which enormously simplifies the manufacturing method, reduces its cost and limits the generation of scrap and the manufacturing errors when many operations are required.

The invention claimed is:

1. A method for manufacturing a sole structure, the method comprising:
 (i) providing at least one textile sole element having an external face, comprising one or several at least partly hot-meltable yarn(s);
 (ii) disposing the textile sole element in a mold structure comprising a sole cavity;
 (iii) disposing an inflatable bladder in the mold structure, and inflating the inflatable bladder to press, directly or indirectly, the external face of the textile sole element against the sole cavity, and heating the textile sole element to melt the at least partly hot-meltable yarn(s) and mold the sole cavity on the external face of the textile sole element; and
 (iv) obtaining a sole structure comprising at least one thermo-compressed textile sole element.

2. The method for manufacturing a sole structure according to claim 1, wherein the textile sole element comprises a textile sole support having an external face, and one or several textile functional region(s) disposed on the external face of the textile sole support.

3. The method for manufacturing a sole structure according to claim 2, wherein the textile functional region(s) is/are one or several textile pocket(s).

4. The method for manufacturing a sole structure according to claim 1, wherein the textile sole element comprises a textile sole support having an external face, and a continuous or discontinuous textile layer, comprising one or several at least partly hot-meltable yarn(s), disposed along the external face of the textile sole support.

5. The method for manufacturing a sole structure according to claim 4, wherein the continuous or discontinuous textile layer comprises a section having a thickness $e_i$ in step i) and a thickness $e_f$ in step iv), $e_i$ being different from $e_f$.

6. The method for manufacturing a sole structure according to claim 2, wherein the ratio of the mass of the hot melted material derived from the at least partly hot-meltable yarn(s) in said at least one textile sole element to the total mass of said at least one textile sole element is greater than or equal to 50%.

7. The method for manufacturing a sole structure according to claim 2, wherein the textile sole element is of unitary textile construction.

8. The method for manufacturing a sole structure according to claim 1, wherein the sole structure is an outsole.

9. A method for manufacturing a footwear, the method comprising the implementation of the method for manufacturing a sole structure according to claim 2, providing a main textile bootie comprising one or several at least partly hot-meltable yarn(s), and thermoforming the main textile bootie.

10. The method according to claim 9, wherein said at least one textile sole element is of unitary textile construction with the main textile bootie.

11. The method according to claim 9, wherein said at least one textile sole element is a textile envelope comprising a sole portion and a peripheral portion for partially wrapping the foot.

12. The manufacturing method according to claim 9, comprising an auxiliary textile bootie comprising one or several at least partly hot-meltable yarn(s) having a volume for accommodating the foot receiving, at least partly, the main textile bootie.

13. The manufacturing method according to claim 9, wherein the sole structure in step iv) comprises one or more of a hot melted textile material of the at least partly hot melted main bootie and a hot melted textile material of the at least partly hot melted auxiliary bootie.

14. The method for manufacturing a sole structure according to claim 1, wherein the textile sole element comprises a textile sole support having an external face, and one or several textile functional region(s) disposed in a spaced and located manner on the external face of the textile sole support.

15. The method for manufacturing a sole structure according to claim 1, wherein the sole structure is an outsole, said outsole comprises one or several fully or partly hot melted textile studs.

16. The method for manufacturing a sole structure according to claim 15, wherein the ratio of the mass of the hot melted material derived from the at least partly hot-meltable yarn(s) in said at least one textile sole element to the total mass of said at least one textile sole element is greater than or equal to 50%.

17. The method for manufacturing a sole structure according to claim 1, wherein said sole structure has a full molded volume.

18. The method for manufacturing a sole structure according to claim 1, wherein said at least one thermo-compressed textile sole element obtained in step iv) is not an embossed textile sole element.

19. The method for manufacturing a sole structure according to claim 1, wherein the sole cavity comprises at least one of a negative and a positive cavities, and wherein during step (iii) said at least one of a negative and positive cavities is molded on the external face of the sole structure by filling the at least one of a negative and a positive cavities of the sole cavity with hot melted material(s) derived from the at least partly hot-meltable yarn(s).

20. The method for manufacturing a sole structure according to claim 1, wherein the inflatable bladder is disposed between the mold structure and an internal face of the at least one textile sole element so that the inflated bladder comes into contact directly or indirectly with the internal face of the at least one textile sole element, and wherein the mold structure, comprising the sole cavity, is in several parts.

* * * * *